(12) United States Patent
Durack et al.

(10) Patent No.: US 12,699,037 B2
(45) Date of Patent: Aug. 4, 2026

(54) SEGMENTED SIDE FLUORESCENCE DETECTOR FLOW CYTOMETRY

(71) Applicant: CYTONOME/ST, LLC, Bedford, MA (US)

(72) Inventors: Gary Durack, Urbana, IL (US); William J. Williams, V, Medford, MA (US)

(73) Assignee: CYTONOME/ST, LLC, Lexington, MA (US)

( * ) Notice: Subject to any disclaimer, the term of this patent is extended or adjusted under 35 U.S.C. 154(b) by 301 days.

(21) Appl. No.: 18/384,641

(22) Filed: Oct. 27, 2023

(65) Prior Publication Data

US 2024/0142368 A1 May 2, 2024

Related U.S. Application Data

(60) Provisional application No. 63/420,427, filed on Oct. 28, 2022.

(51) Int. Cl.
G01N 15/1434 (2024.01)
G01N 15/1429 (2024.01)

(52) U.S. Cl.
CPC ..... G01N 15/1434 (2013.01); G01N 15/1429 (2013.01); *G01N 2015/1452* (2013.01)

(58) Field of Classification Search
CPC ........... G01N 15/1434; G01N 15/1429; G01N 2015/1452; G01N 15/1459; G01N 2015/1006

(Continued)

(56) References Cited

U.S. PATENT DOCUMENTS

2015/0112627 A1 4/2015 Nitta et al.
2017/0315046 A1 11/2017 Du et al.
(Continued)

FOREIGN PATENT DOCUMENTS

EP 2889603 A1 7/2015
WO WO-02071400 A2 * 9/2002 ............... G11B 7/14
WO WO-2012012163 A2 * 1/2012 ......... G01N 15/1456

OTHER PUBLICATIONS

International Search Report and Written Opinion for Application No. PCT/US2023/036112, dated Feb. 27, 2024, 12 pages.
(Continued)

*Primary Examiner* — Md M Rahman
(74) *Attorney, Agent, or Firm* — McCarter & English, LLP

(57) ABSTRACT

A method, system and apparatus for selecting cells is disclosed. An example embodiment provides spatial information denoting the location, on a four part array of sensors, referred to as a quad array, of the center, of each particle that passes through the focused laser beam in a cell sorter. The center of a particle is commonly determined by the average fluorescence intensity within the field of view of a Side Fluorescence (SFL) collection lens. Fluorescence collected by an SFL lens from a particle having any orientation and any position in the core stream produces a spot large enough to illuminate all four segments of a quad array. By independently measuring the fluorescence intensity recorded by each of the four array segments for a particle, it is possible to calculate the x-y coordinate position across the quad array segments of the average total fluorescence emission collected from that particle.

20 Claims, 21 Drawing Sheets

SFL QUAD ARRAY

QUAD SiPM ARRAY 110
FOCUS 112
FOLDING MIRROR/PRISM 114
BANDPASS OPTICAL FILTER 118
IMAGING LENS 116
FOLDING MIRROR/PRISM 120
COLLECTION LENS 122
FLUORESCENCE EMISSION 124

50 mm

(58) Field of Classification Search
USPC .......................................................... 356/73
See application file for complete search history.

(56) References Cited

U.S. PATENT DOCUMENTS

| | | |
|---|---|---|
| 2019/0360911 A1 | 11/2019 | Loinaz |
| 2020/0158615 A1 | 5/2020 | Shi et al. |
| 2021/0080368 A1 | 3/2021 | Sharpe et al. |
| 2021/0285882 A1 | 9/2021 | Kiesel et al. |

OTHER PUBLICATIONS

International Preliminary Report on Patentability for Application
No. PCT/US2023/036112, dated May 8, 2025, 10 pages.

* cited by examiner

SFL QUAD ARRAY

21% SIMULATED INCREASE IN SORTABLE X CELLS OVER CLASSICAL

| Viper | | | Gen III | |
| --- | --- | --- | --- | --- |
| Sort Region | All Live | X-Sortable | All Live | X-Sortable |
| Top Orient | 45.9% | 22.6% | | |
| Center Left | 6.4% | 2.9% | | |
| Center Right | 8.8% | 4.1% | | |
| Bottom | 27.6% | 13.4% | | |
| Total Percent Live Cells | 88.7% | 43.0% | 85.90% | 35.5% |

178

178

SEGMENTED SIDE FLUORESCENCE DETECTOR FLOW CYTOMETRY

RELATED APPLICATION

This application claims the benefit of, and priority to, U.S. Provisional Patent Application No. 63/420,427, filed Oct. 28, 2022, entitled "Segmented Side Fluorescence Detector Flow Cytometry", the contents of which are incorporated herein in their entirety.

TECHNICAL FIELD

The present disclosure relates generally to devices, systems and techniques for manipulations of fluids; to flow-focusing technology; and to microfluidics. The present disclosure relates more particularly to microfluidic systems, methods and apparatus used to manipulate particles, cells and fluids and systems for orientation measurement and optical alignment of those particles and cells.

BACKGROUND

Microfluidics is an area of technology involving fluid-flow control at a small scale. Microfluidic devices often include very small channels through which fluid flows. The channels may branch or be otherwise arranged to allow fluids to combine, or to divert fluids to different locations; to cause laminar flow between fluids; to dilute fluids, and the like.

Flow cytometers are used for analyzing and sorting particles in a fluid sample, such as cells of interest in a biological fluid or chemical sample. A flow cytometer often includes a sample reservoir for receiving a fluid sample and a sheath reservoir for containing a sheath fluid. Cells are observed in the flow cytometer and, based upon the observation, cells having a desirable characteristic or an undesirable characteristic are acted upon so as to separate the cells having the desirable characteristic from the remaining cells which are usually discarded.

Cells with a desirable characteristic or an undesirable characteristic can be acted upon with some form of energy imparted on the cell. Some processes are described below.

Surface Acoustic Waves (SAWs) can be used to drive microfluidic actuation. SAWs are used to create inertial forces and to change fluid velocities and therefore affect the movement of cells and particles. SAWs can generate acoustic waves that are oriented longitudinally or transversely (or a combination of longitudinally and transversely) SAWs can be used in droplet-based microfluidics, wherein droplets are manipulated as an actuation mechanism. Droplets may be pushed toward outlets for sorting. Other processes involve droplet size modulation for splitting, trapping, tweezing or nano-fluidic pipetting.

Optical tweezers are instruments that use highly focused lasers to hold and move microscopic objects such as atoms, nanoparticles and droplets. The laser provides an attractive or repulsive force depending on the relative refractive index between a particle and its ambient medium.

Magnetic-activated cell sorting (MACS) is a method of separating cells wherein cells are marked with magnetic beads or micro-beads and passed through a magnetic field. Cells paired with microbeads attach to the magnetic field and non-paired cells are removed.

Buoyancy-activated cell sorting (BACS) is a separation technique in which microbubbles bind to cells through antibodies that bind to the surface of cells. Targeted cells are removed from a sample by flotation.

Dielectrophoresis is a process by which a polarizable particle is suspended in a non-uniform electric field. The electric field polarizes the particle, wherein the poles experience a force along the field lines. Field lines may be either attractive or repulsive according to the orientation on the dipole. Since the field is non-uniform, the pole experiencing the greatest electric field dominates over the other and the particle moves. The environment is commonly arranged such that a minor movement of the particle is sufficient to divert the particle onto a specific flow path intended for chosen cells.

Microfluidic cell sorting systems can detect cells, droplets or particles based on an image, light scatter, fluorescence signal or any combination of the three. Such a detection method and apparatus is responsible for coordinating with hardware and software to control identification of particles and tracking of those particles and to control the related physical separation action in which chosen cells are separated from the remaining cells. Operational efficiency of microfluidic cell sorting systems may be improved when cells are evenly spaced.

Most mammalian species demonstrate between about 2% to 5% difference in DNA content. A relatively greater success rate in differentiating X-Chromosome bearing sperm and Y-chromosome bearing sperm can occur when analyzed cells are in a uniform alignment and uniform orientation. The optimal cell alignment for gender specific discrimination occurs when one of the sperm cell's flat sides is facing a laser beam and one of its narrow edges is observable on a Side Fluorescence detector (SFL). Cells with higher SFL intensity produce improved Forward Fluorescence detector (FFL) measurement precision.

SUMMARY

Systems and methods taught herein employ a multi-segment optical detector as a part of the side fluorescence detector optical path or forward fluorescence detector optical path. An example of a multi-segment optical detector is a quad array. A quad array provides spatial information denoting the location on the quad array of the center of the photonic emission cross-section that is focused onto the detector for each particle that passes through the focused laser beam on a cell sorter. The center of the photonic emission cross-section focused onto the detector from a particle is commonly determined by the two dimensional average fluorescence intensity within the field of view of a Side Fluorescence (SFL) collection lens. Fluorescence collected by an SFL lens from a particle having any orientation and any position in the core stream is focused on to the detector such that the focused emission produces a spot large enough to illuminate all four segments of a quad array. By independently measuring the fluorescence intensity recorded by each of the four array segments for a particle, it is possible to calculate the x-y coordinate position across the quad array segments of the average total fluorescence emission cross-section collected from that particle.

In one embodiment, a cytometer includes a collection lens configured to collect light emitted from a particle flowing in a stream. The cytometer also includes a multi-segment optical detector to receive light collected by the collection lens. Additionally the cytometer includes a processor configured or programmed to process signals from the multi-segment optical detector to estimate an x-position and a y-position of a location of an average light intensity emitted by the particle to determine an orientation of the particle.

In another embodiment, a cytometer includes a collection lens configured to collect light emitted from a particle flowing in a stream. The collection lens is configured to incline between 0 and 30 degrees. The cytometer further includes a 2×2 quad array to receive light collected by the collection lens. Additionally, the cytometer includes a processor configured or programmed to process signals from the 2×2 quad array to estimate an x-position and a y-position of a location of an average light intensity emitted by the particle to determine an orientation of the particle.

In a further embodiment, a method for determining orientation of a particle with a cytometer includes the step of collecting light emitted from a particle flowing in a stream with a collection lens. The method further includes receiving the collected light with a multi-segment optical detector. Additionally, the method includes the step of processing signals from the multi-segment optical detector with a processor to estimate an x-position and a y-position of a location of an average light intensity emitted by the particle to determine an orientation of the particle.

BRIEF DESCRIPTION OF THE DRAWINGS

It is to be noted that the various features and combinations of features described below and illustrated in the figures can be arranged and/organized differently to result in embodiments which are still within the spirit and scope of the present disclosure. Further, components in the drawings are not necessarily to scale nor are they necessarily rendered proportionally, emphasis instead being placed upon clearly illustrating the relevant principles. Even further, various features may not be shown in certain figures in order to simplify the illustrations. Additionally, for the purposes of describing or showing items between layers or behind other elements or for generally simplifying the views in certain of these figures, various components or elements may be illustrated as transparent or using cross-hatching or other standard drawing techniques may be presented. To assist those of ordinary skill in the art in making and using the disclosed systems, assemblies and methods, reference is made to the appended figures.

DETAILED DESCRIPTION

For commercial cell sorting, inconsistent sperm cell orientation limits the fraction of cells that can be classified for gender by cytometry. Therefore, improvements in hydrodynamic methods to better orient cells, in optical techniques to reduce the impact of orientation on measurement, or signal processing/computational methods to increase the fraction of gender-classifiable cells are of significant interest. The present disclosure relates to a method and apparatus for sorting cells wherein a quad array is used to determine the orientation and position of particles in a stream for the purpose of improving accuracy in particle sorting.

As used herein, the term "particles" includes, but is not limited to, cells (e.g., sperm cells, blood platelets, white blood cells, tumorous cells, embryonic cells, stem cells, spermatozoa, etc.), organelles, and multi-cellular organisms. Particles may include liposomes, proteoliposomes, yeast, bacteria, viruses, pollens, algae, or the like. Additionally, particles may include genetic material, RNA, DNA, fragments, proteins, etc. Particles may also refer to non-biological particles. For example, particles may include metals, minerals, polymeric substances, glasses, ceramics, composites, or the like. Particles may be naturally occurring or man-made. Particles may also refer to synthetic beads (e.g., polystyrene), for example, beads provided with fluorochrome conjugated antibodies. For the purpose of clarity the term particles is used to refer to any cells or other particles intended to be sorted in a microfluidic device. As used below, the term "cells" should be construed as being generic to any type of particle described above absent a specific intention to limit the term to cells specifically.

Figure 1:
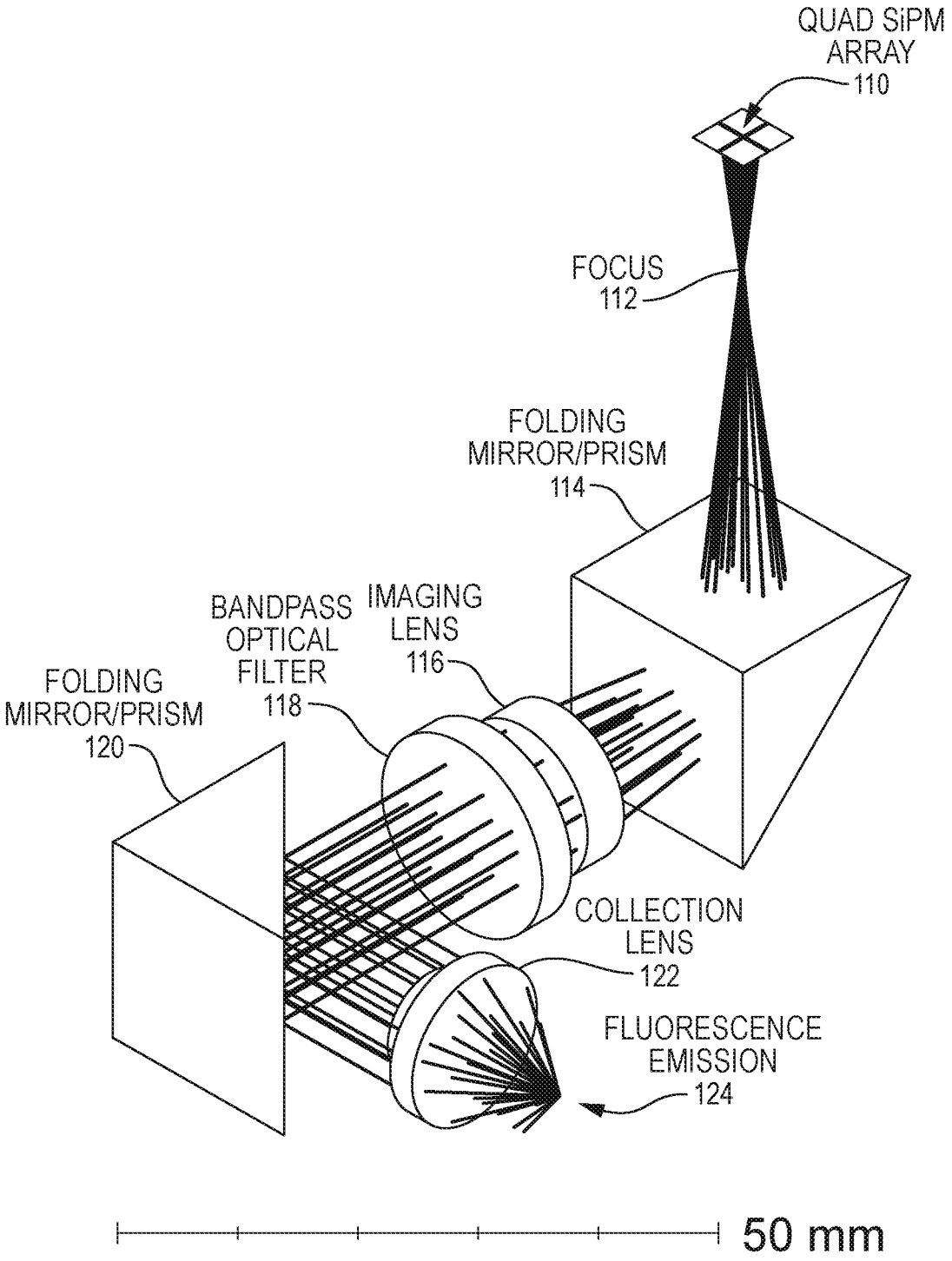
FIG. 1 is an illustration of an example embodiment of the present disclosure.

FIG. 1 shows a quad array 110 used in a particle sorting apparatus. Fluorescence is emitted 124 through a collection lens 122, following to a first folding mirror or prism 120 where it is turned 90° and passes through a bandpass optical filter 118 and then through an imaging lens 116 following through a second folding mirror or prism 114 where it is turned 90° and comes to a focus 112. The quad array 110 is placed behind the focus so that the beam expands to fill the segments of the quad array 110 It should be appreciated that the optical arrangement of FIG. 1 is exemplary and other arrangements in which a fluorescence emission can be transmitted from an origination point to a quad detector array (e.g. arrangements using different lens combinations, optical fibers etc.) should be considered to be within the scope of the present invention. It should further be appreciated that embodiments of the present invention may utilize different types of N×N detectors and are not limited to the quad detectors specifically described herein. While a 2×2 "quad" detector provides cost savings and the benefit of limiting the amount of redundant data that is generated, greater density arrays offer a greater ability to discriminate cell position (albeit with the trade-off of greater cost and requiring the processing of additional data in real-time) and these additional types of N×N arrays beyond the 2×2 arrays discussed herein should also be considered to be within the scope of the present invention. While the present invention is discussed in the context of a 2×2 quad sensor arrangement, there are commercially available detectors in the 8×8 and 16×16 format that are readily utilized in conjunction with the present invention. The recitation of a 2×2 sensor arrangement is not intended to be limiting in scope. The illustrative descriptions herein of quad detectors should therefore be understood to also be applicable to other types of N×N detectors (i.e. more than 2×2).

Figure 2:
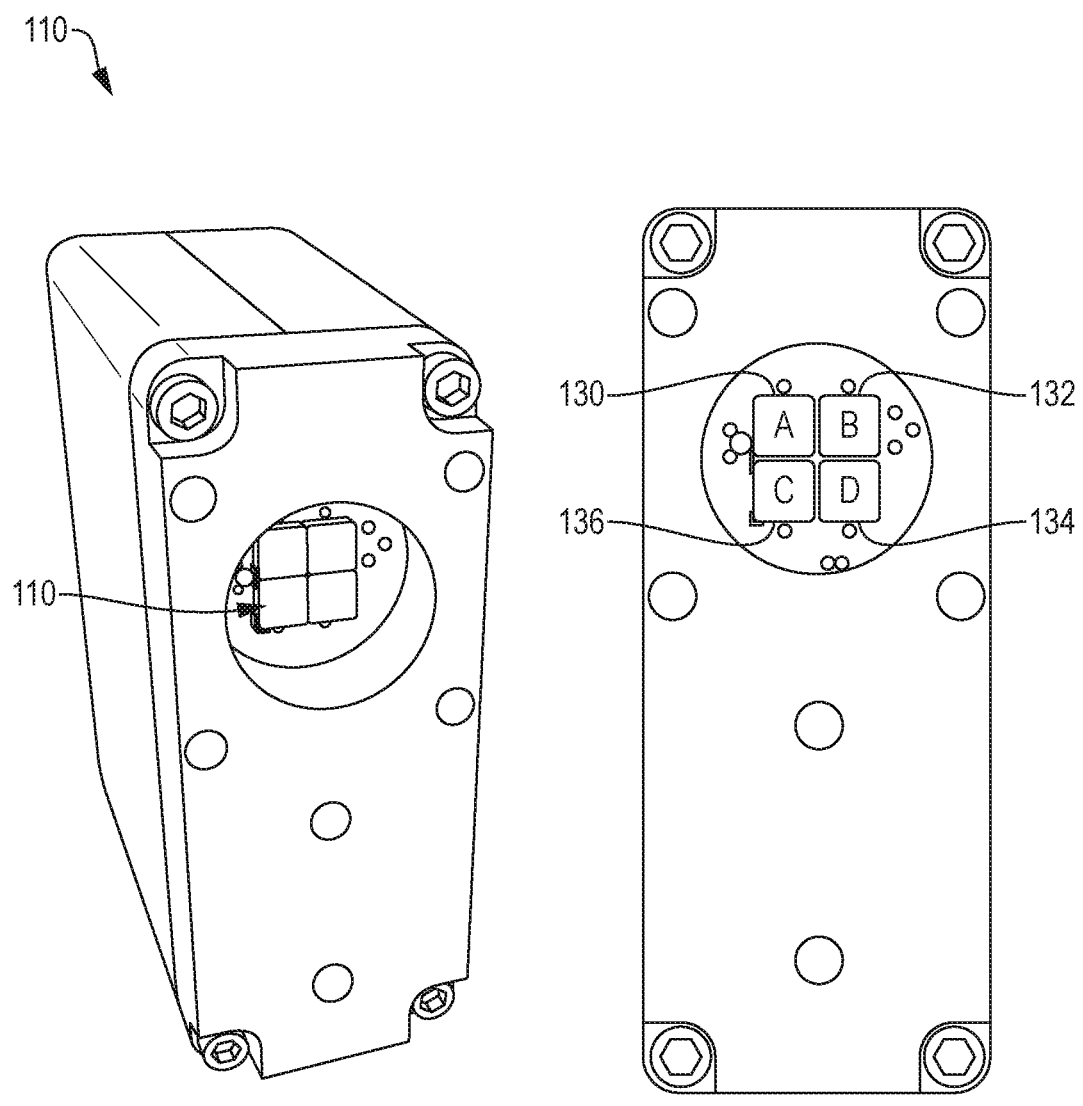
FIG. 2 is an illustration of a quad array of the present disclosure.
Figure 3:
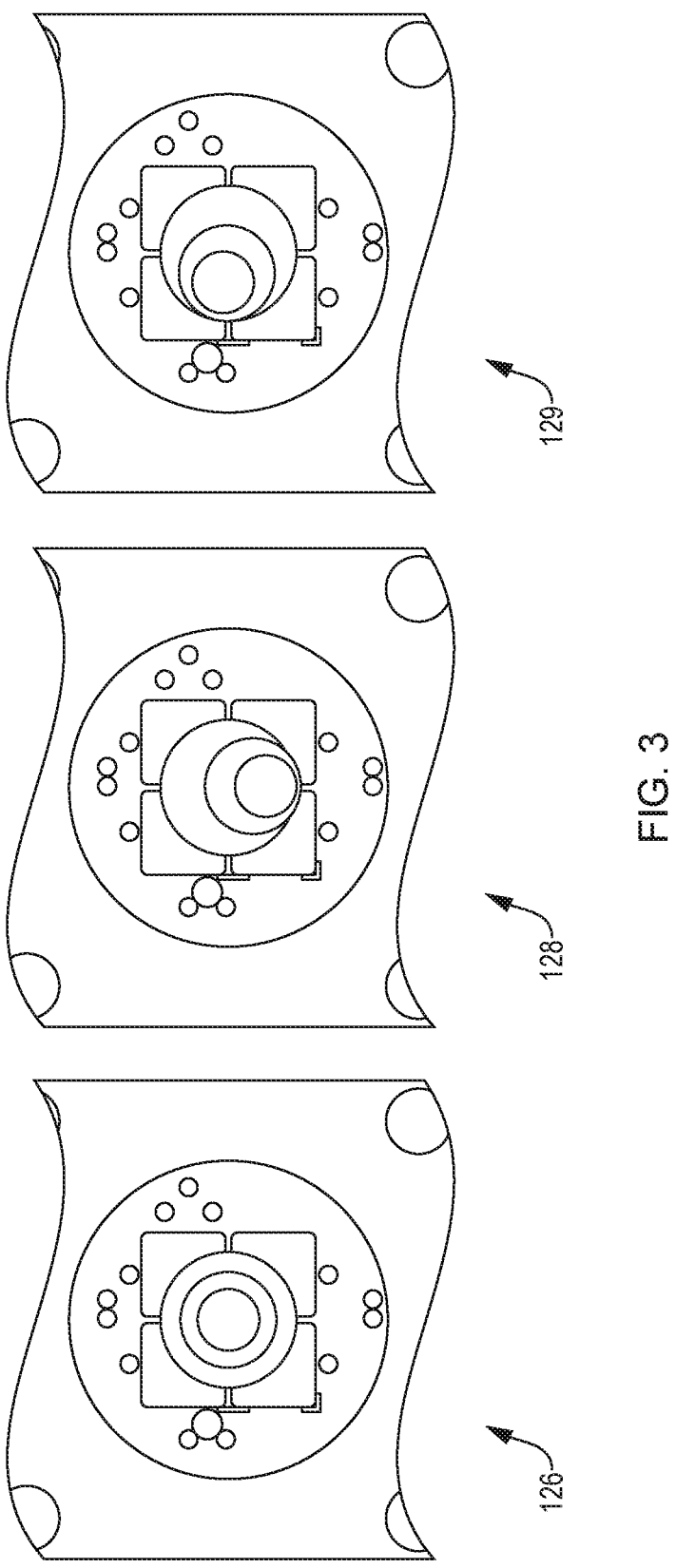
FIG. 3 is an illustration depicting the function of a quad-array.

FIG. 2 and FIG. 3 illustrate the method by which the quad array 110 is used to find the spatial center of the fluorescence intensity distribution incident on the quad array 110 for emission within an SFL collection lens field of view for a labelled cell. FIG. 2 depicts a quad array 110 in an assembly. The quad array 110 has four segments: segment A 130, segment B 132, segment C 136, and segment D 134. Light within the field of view of the SFL collection lens is focused and then projected onto the quad array 110, specifically, onto segments A-130, B-132, C-136 and D-134. Fluorescence intensity is independently measured for each segment. To estimate the x-y position for the average fluorescence emission from a cell, the following equations are applied. $Pos_x$ is the location of the average emission intensity distribution in the x-direction.

$$Pos\_x = \frac{(A+C)-(B+D)}{(A+B+C+D)}$$

$Pos_y$ is the location of the average emission intensity distribution in the y-direction.

$$Pos\_y = \frac{(A+B)-(C+D)}{(A+B+C+D)}$$

Total emission intensity $I_{fluorescence}$ is the sum of the four intensities.

$$I_{Fluorescence}=(A+B+C+D)$$

FIG. 3 shows how the fluorescence intensity distribution may be offset about the 4 segments A-130, B-132, C-136 and D-134. The size of the projected emission spot is determined by the working distance from the collection lens to the cell and the distance from the internal focus 112 to the plane of the quad array 110 segments A-130, B-132, C-136 and D-134. Each segment in the array measures a spatial fraction of the total projected spot intensity. The electrical signal produced by each quad array segment is amplified and then input to a streaming analog to digital converter (ADC). Each segment in the quad array produces a time-varying signal that represents the variation in fluorescence intensity during the cell's time of flight through the laser beam. In some embodiments, a field programmable gate array (FPGA) is used to process the ADC samples. In some embodiments, a microprocessor, GPU or other programmable or configurable processor is used in place of or in conjunction with an FPGA. The FPGA identifies pulses associated with a cell and then calculates parameter values for each signal input, such as height, area and width. Four correlated sets of parameters are calculated for a cell measured by the Quad Array, one set for each Quad Array segment. The FPGA plugs these measured intensity values into the equations for $Pos_x$, $Pos_y$, and $I_{fluorescence}$. This calculation essentially yields x-y spatial coordinates on the Quad Array for the average intensity seen for each cell by the Quad Array. These x and y coordinates are referred to respectively as Position_x ($Pos_x$) and Position_y ($Pos_y$) values for each cell. These values represent the spatial eccentricity in the fluorescence emission intensity function as viewed by the SFL collection lens and provide a quantitative value for where the average intensity of the emission incident on the SFL collection lens is located. In addition, by summing the total intensity measured by each Quad Array segment it is possible to obtain the traditional total SFL intensity measurement. Therefore, the Quad Array provides both the traditional measurement of total SFL fluorescence intensity plus new information regarding how the emission intensity is spatially distributed within the field of view of the SFL collection lens. Referring to FIG. 3, example 126 demonstrates $Pos_x=0$ and $Pos_y=0$. Example 128 demonstrates $Pos_x=0$ and $Pos_y=-0.70$. Example 129 demonstrates $Pos_x=0.70$ and $Pos_y=0$.

Figure 4A:
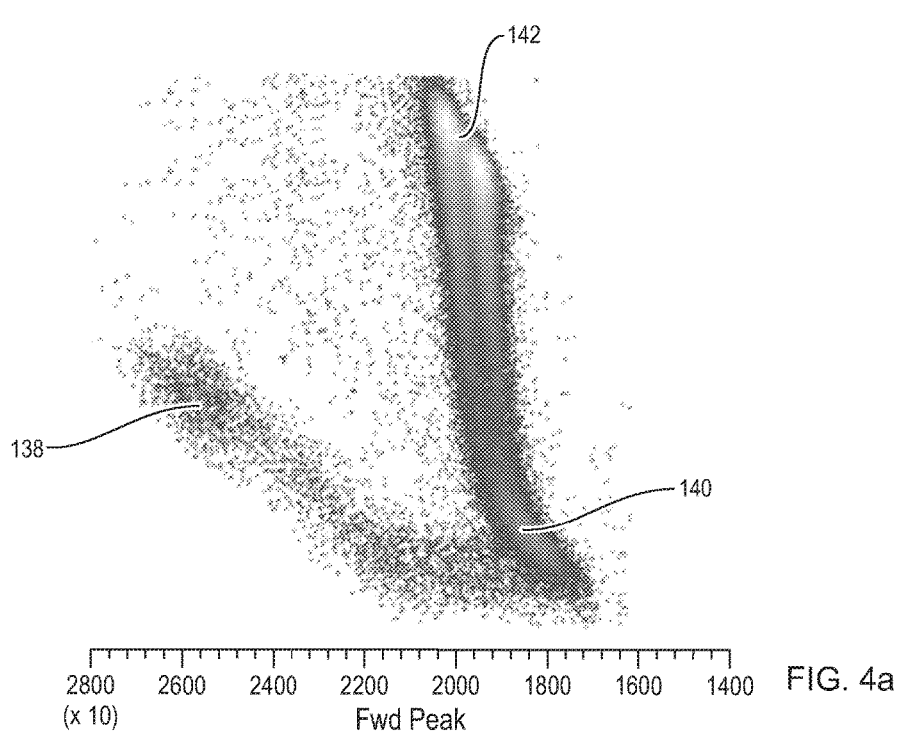
FIG. 4*a* is a traditional plot from a common cell sorter.
Figure 4B:
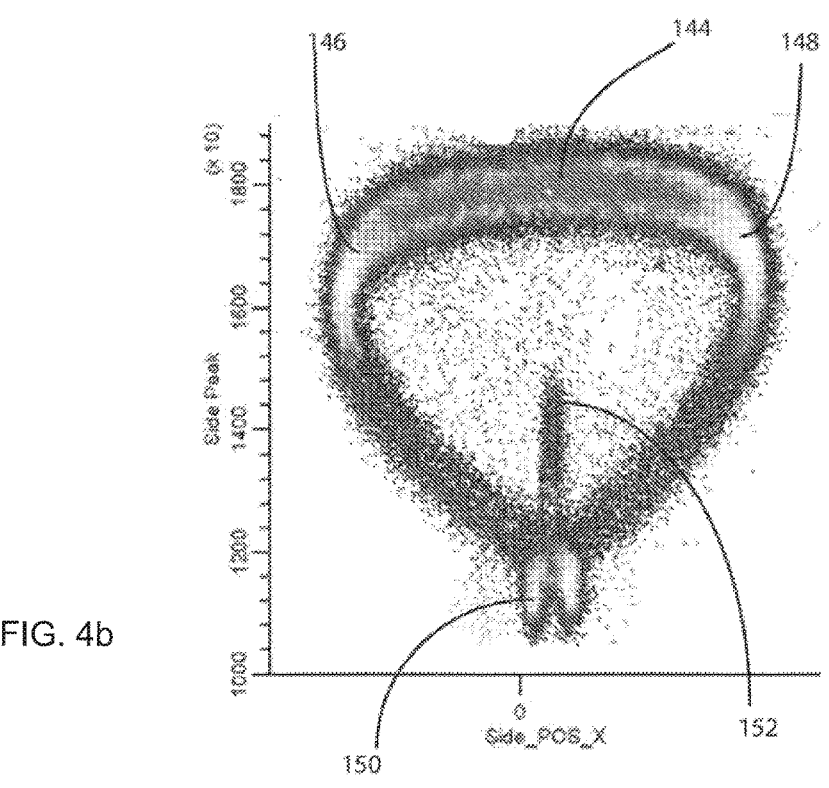
FIG. 4*b* demonstrates data captured using a Quad Array.

Referring to FIG. 4*a* and FIG. 4*b*, a traditional plot from a common cell sorter is shown in FIG. 4*a*. Data taken using the Quad Array 110 on a cell sorter running live bovine sperm cells stained with Hoechst 33342 is depicted in FIG. 4*b*. The plot in FIG. 4*b* may be referred to as a necklace plot, named for its shape. Both plots share the same SFL as their y-axis and both plots contain measurements for the same set of cells. The plot in FIG. 4*a* is the traditional plot that shows the correlation of FFL and SFL intensities. The plot in FIG. 4*b* shows some of the additional information provided by the Quad Array for the same set of measured cells. In this plot, cells varying in SFL intensity can be seen to have spatial intensity distributions centered to the left and right of the SFL collection lens (and Quad Array) center. The most aligned cells, 142 in FIGS. 4*a* and 144 in FIG. 4*b* are centered, but the less oriented cells can either have spatial intensity centered to the left (seen in area 146) or right (seen in the area 148) of the center of the SFL (or Quad Array). Cells least oriented, e.g., near 90° and 270°, are depicted by area 138, in FIG. 4*a* and by area 152 in FIG. 4*b*. Cells near 45° and 135° are depicted by the area 140 in FIG. 4*a* and by area 150 in FIG. 4*b*. Cells can orient their narrow edge, and therefore the most intense radiation, at various angles to the SFL collection lens center. The plot in FIG. 4*b* provides a reasonably precise measurement of sperm cell orientation for the cells considered well enough oriented to be candidates for gender classification. This additional orientation information can be used to increase the fraction of cells sorted for gender-based artificial insemination.

Figure 5:
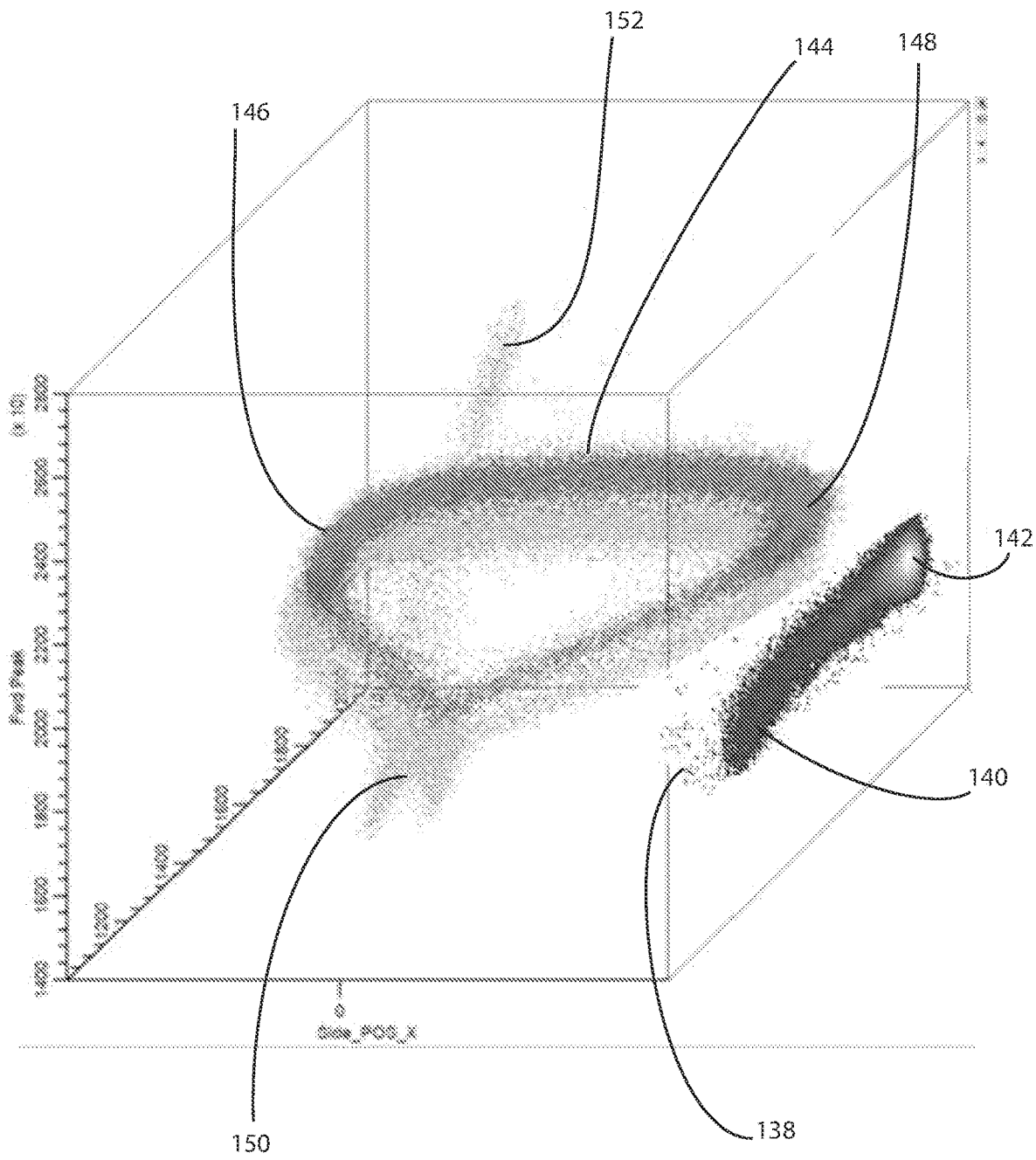
FIG. 5 illustrates the information related to cell orientation that is provided by a Necklace Plot.

FIG. 5 illustrates the new information related to sperm cell orientation that is provided by the Necklace Plot. This is the same data as used in FIGS. 4*a* and 4*b*. In this case FFL intensity has been added in the y-direction as a $3^{rd}$ axis. The dots colored red are measurements from cells that can be classified as X-chromosome, or female producing, sperm cells. The X cells have also been projected onto the right side to show how the traditional plot would appear for these cells. The most aligned cells, 142 and 144 are centered, but the less oriented cells can either have spatial intensity centered to the left (seen in area 146) or right (seen in the area 148) of the center of the SFL (or Quad Array). Cells least oriented, near 90° and 270° are depicted by area 138, and by area 152. Cells near 45° and 135° are depicted by the area 140 and by area 150.

Once can see visually the more clear discrimination of the X-cells around the Necklace plot. The additional information can be used in a variety of ways, for example by machine learning applications, or other discrimination algorithms to improve the fraction of cells in the sample that can be classified as X or Y cells.

A comparison was done to determine if using the information in the necklace plot was likely to increase the number of "oriented" cells available for classification. Logical filtering of the data (gating) was performed on the same data set collected from live, HO33342 labeled cells. This simulation indicated that 21% more cells (an increase from 35.5% to 43%) would be oriented well enough to be classified for sorting X sperm cells.

Figure 6:
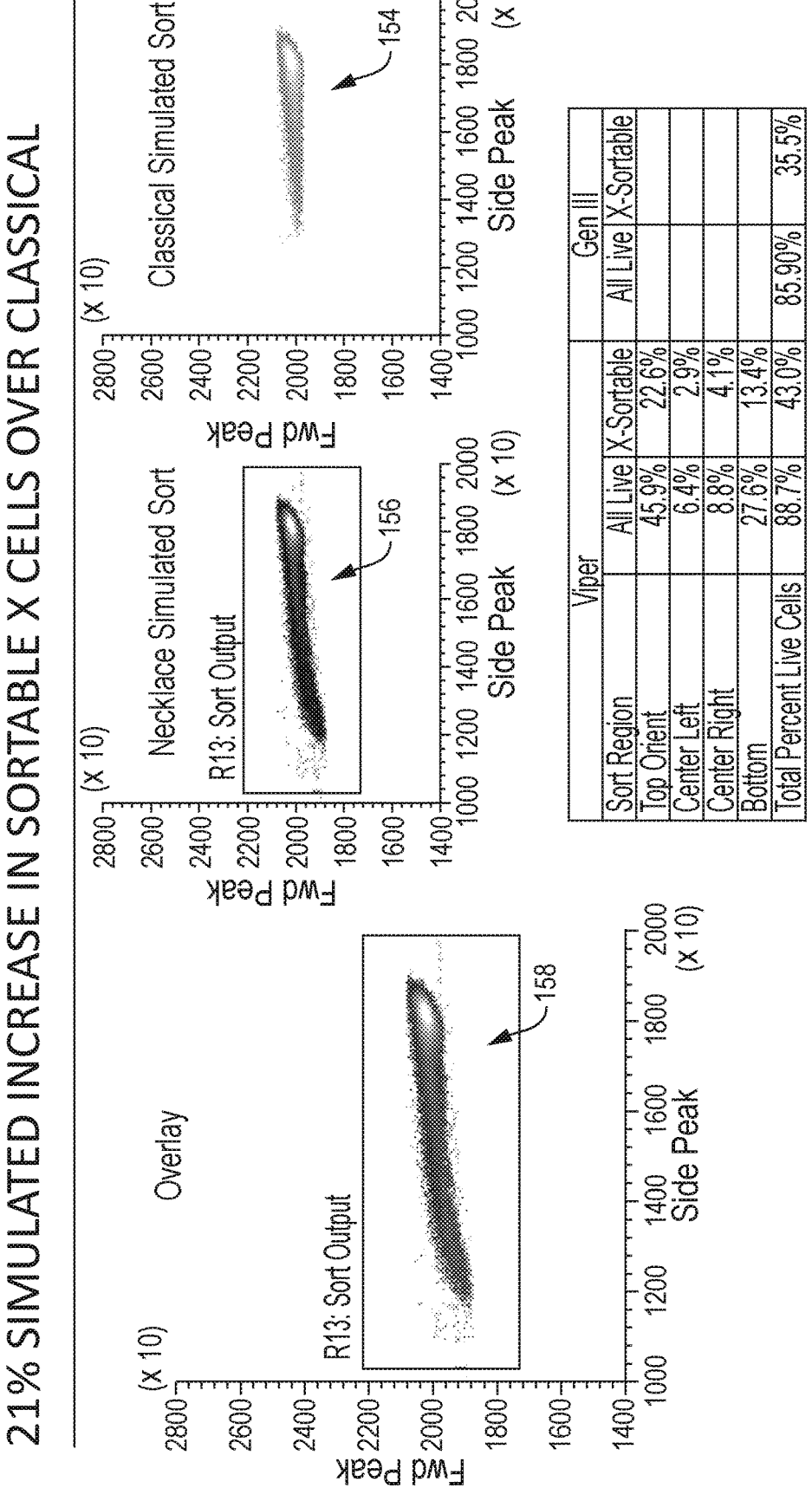
FIG. 6 illustrates the potential difference in the fraction of cells that qualify as oriented.

FIG. 6 illustrates the potential difference in the fraction of cells that qualify as oriented, and therefore available for gender-specific classification. The comparison is between the traditional data filtering, also referred to as gating approach 154, and a Necklace Plot 156. An overlay of the two plots together shows the additional data in plot 158.

Figures 7A, 7B:
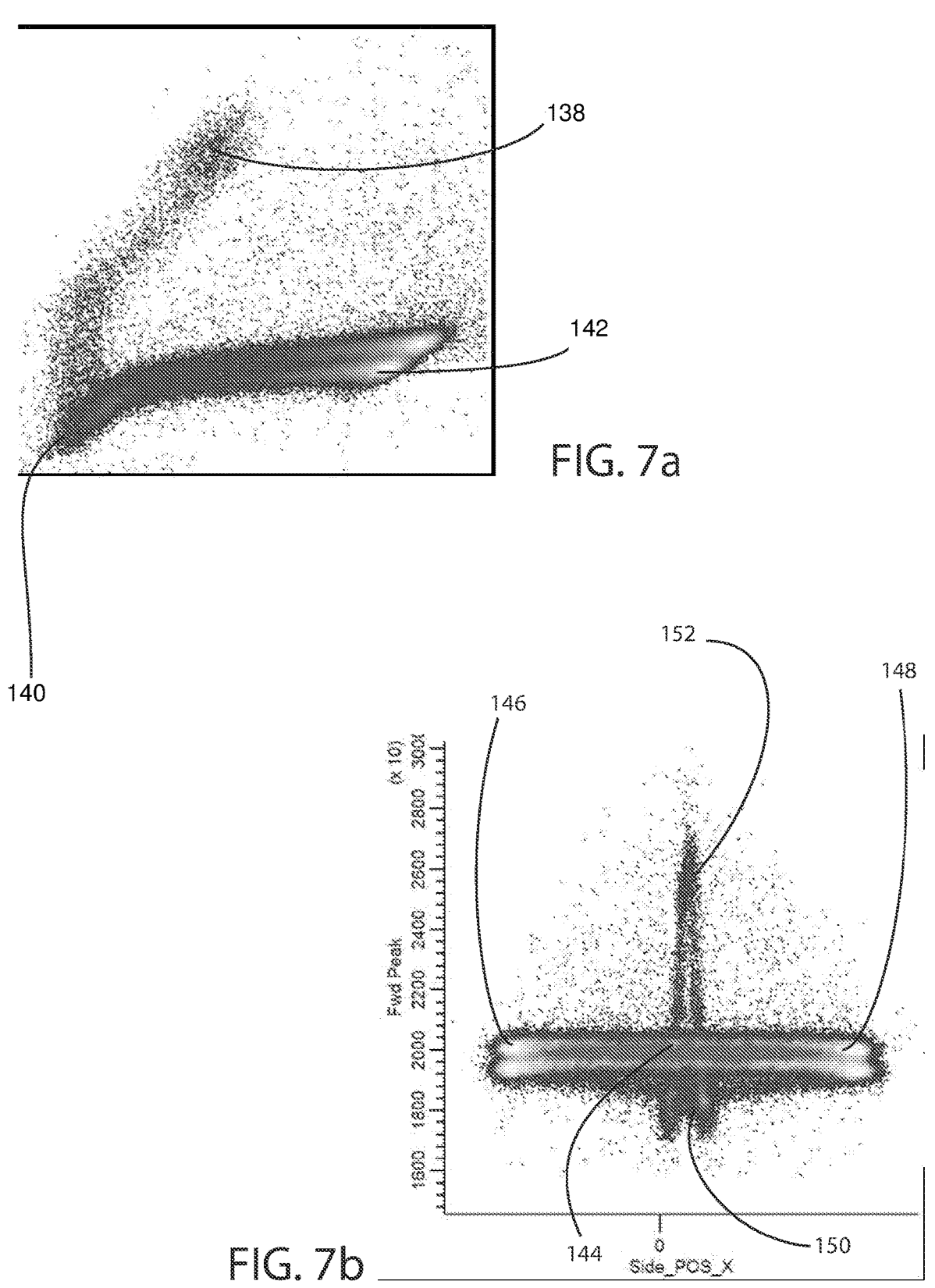
FIG. 7*a* demonstrates the $Pos_x$ information from a Quad Array used to increase the number of "oriented" cells available for gender-specific classification.
FIG. 7*b* further demonstrates the $Pos_x$ information from a Quad Array used to increase the number of "oriented" cells available for gender-specific classification.
Figure 8:
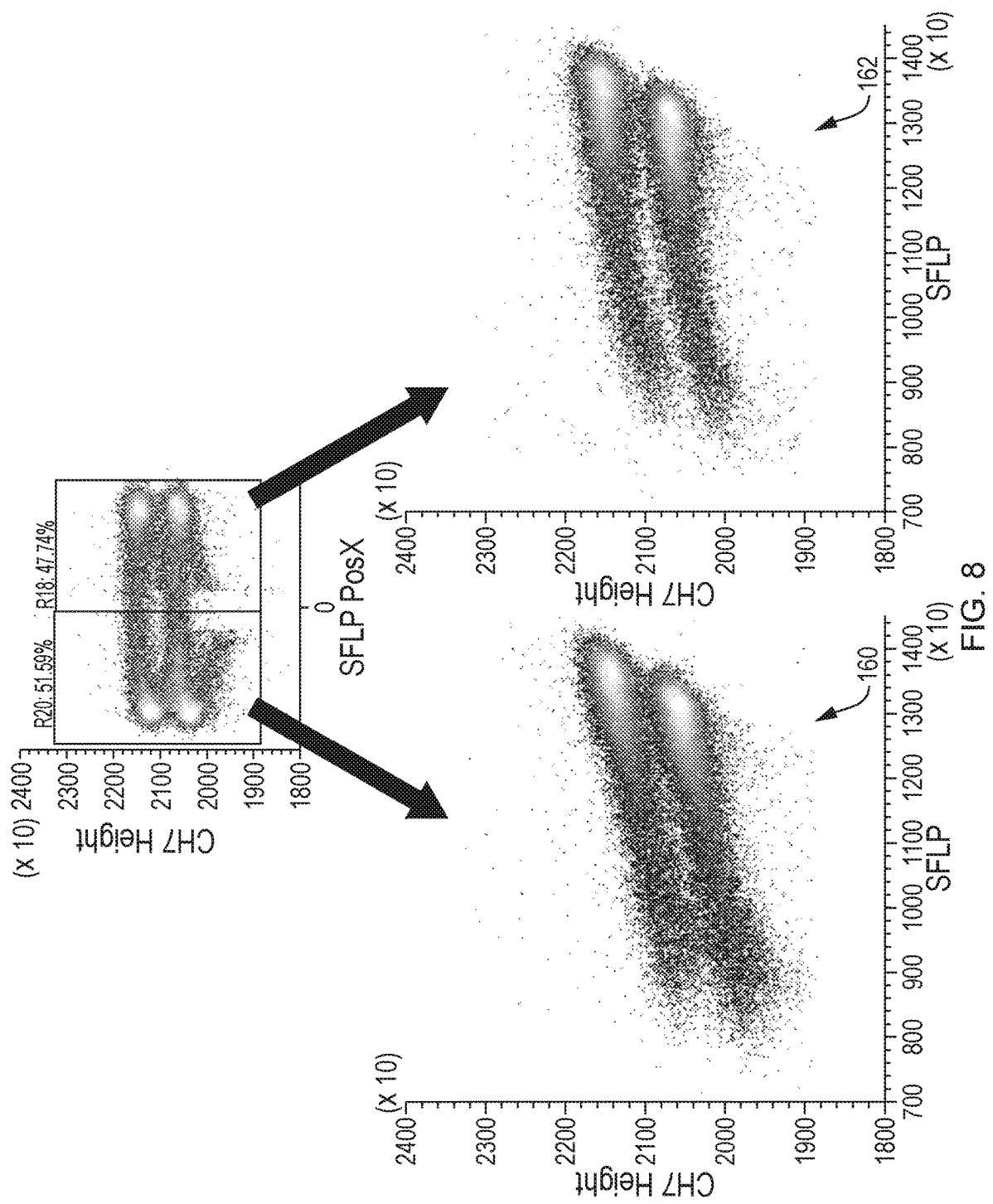
FIG. 8 shows how the orientation information provided by a Quad Array can be used as a diagnostic for instrument measurement performance.

FIGS. 7*a*, 7*b*, and 8 provide additional views of how the $Pos_x$ information from a Quad Array can be used to increase the number of "oriented" cells available for gender-specific classification and to improve the FFL-based discrimination. FIG. 7*a* illustrates the traditional FFL vs. SFL intensity. FIG. 7*b*, which shares the same FFL axis as FIG. 7*a*, illustrates how the two orientation paths previously described in the Necklace Plot correlate with FFL intensity. This further illustrates the value of the additional orientation information provided by the Quad Array. As previously described, the most aligned cells, 142 and 144 are centered, but the less oriented cells can either have spatial intensity centered to the left (seen in area 146) or right (seen in the area 148) of the center of the SFL (or Quad Array). Cells least oriented, near 90° and 270° are depicted by area 138, and by area 152. Cells near 45° and 135° are depicted by the area 140 and by area 150. In some embodiments, increased discrimination of X v Y cells may be accomplished by increasing the array to an 8×8 arrangement.

FIG. 8 shows how the orientation information provided by a Quad Array can be used as a diagnostic for instrument measurement performance. In this figure, the FFL intensity on the negative $pos_x$ side 160 droops lower than the right side, 162. This would not have been obviously visible if one only had access to the traditional FFL vs. SFL plot. FIG. 8 shows how the rate of change for FFL intensity as a function of SFL intensity is different for cells with orientations on the negative $pos_x$ side of the plot. It would be impossible to separately classify these cells without the Quad Array information. In this case there is a subtle error in optical alignment that is producing the asymmetry. The information from Quad Array can be used to either guide correction of the optical alignment error or to simply separately classify the cells. In one embodiment, the information may be used as part of a feedback loop to either align a machine and/or to actively keep an aligned machine in alignment during operation.

Figure 9:
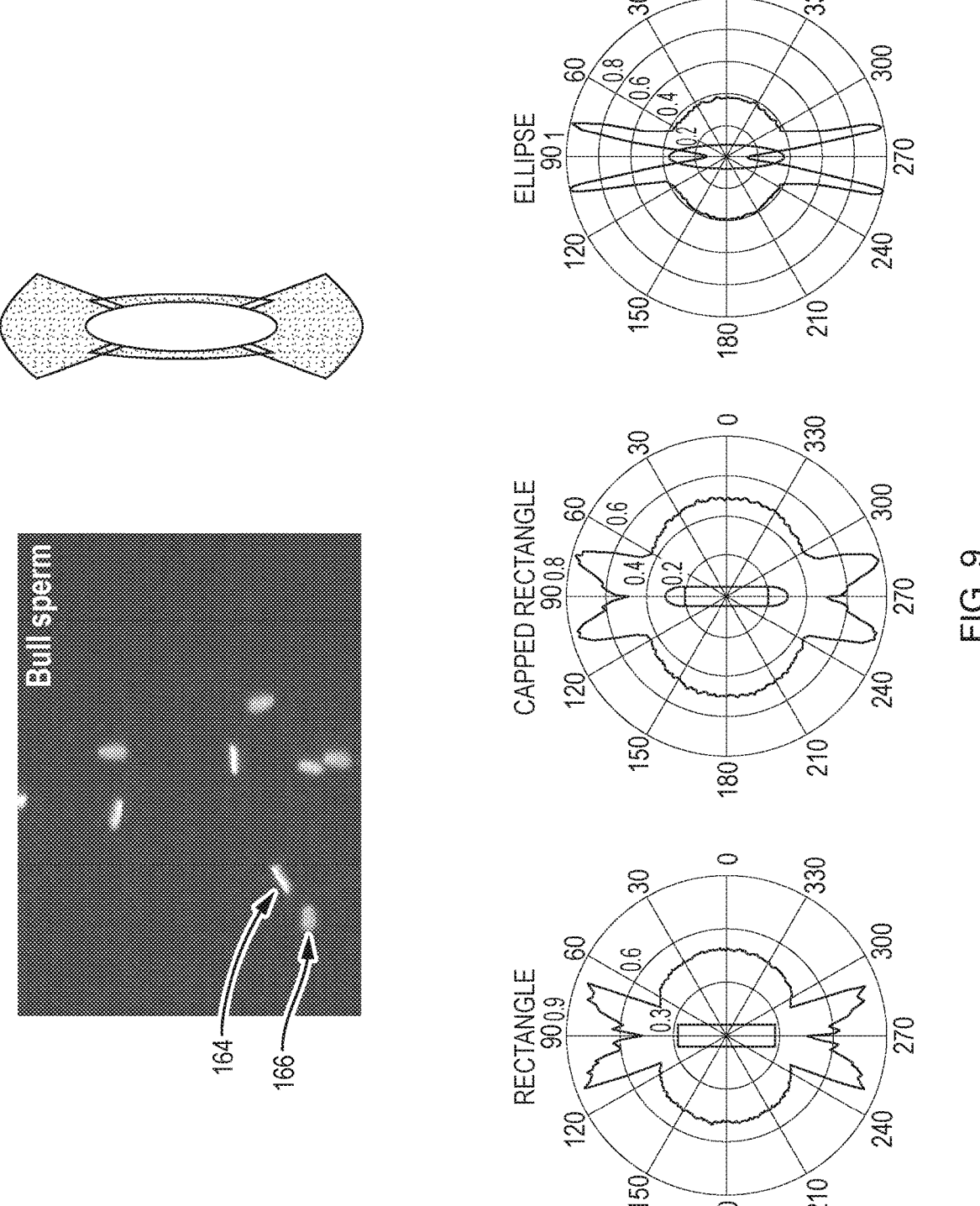
FIG. 9 illustrates the variation of the distribution of radiation intensity from a cell based on the angle of observation.

FIG. 9 illustrates how the distribution of radiation intensity from a single bovine sperm cell stained with HO3342 can vary significantly based on the angle of observation chosen. The head of the sperm is not a cylinder but is shaped more like an oval with narrower edges and flatter faces. In the fluorescence microscopy image (a.) it is easy to see that cells 164 oriented so that the edge is observed by the camera appear much brighter (more focused and higher emission intensity), than the cells 166 with flat faces observed by the camera. The cartoon (b.) illustrates this difference. The outcome of Monte Carlo simulations run on three different models for the radiation pattern are shown in (c.). All three models produce the aforementioned "edge effect" where greater intensity of light is emitted from the edge than the face of the cell.

Figure 10A:
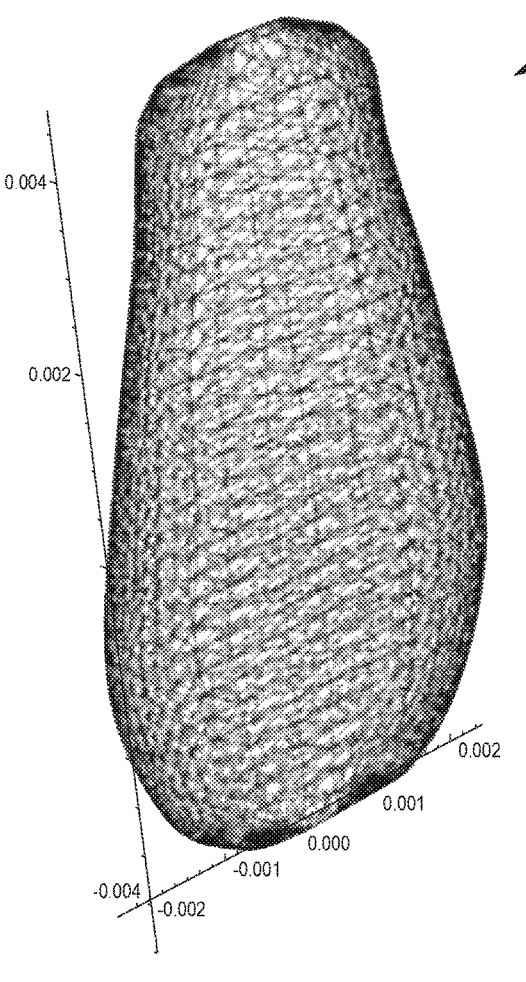
FIG. 10*a* is an illustration of an accurately modeled sperm cell.
Figure 10B:
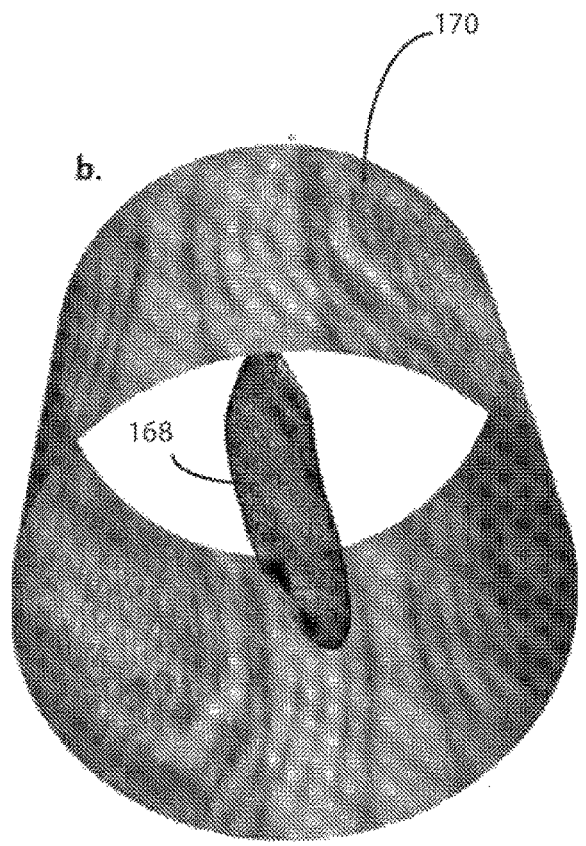
FIG. 10*b* illustrates the radiation pattern projected onto the surface of a cylinder.

FIG. 10*a* is an illustration of an accurately modeled sperm cell 168 with 10,000 emission points on the surface of the model 168. The modeled sperm cell 168 produces a radiation pattern that is in agreement with results observed in a laboratory. In FIG. 10*b*, the modeled sperm cell 168 is placed in a cylinder 170 of modeled water to determine the radiation pattern at the surface of the cylinder 170. The model is a very helpful tool for understanding why the necklace plot has the shape that it does, and for how varying the angle of observation (i.e. radial placement and angle of inclination of the SFL lens; the radial angle placement of the Quad Array and the angle of inclination of the Quad Array) impacts the measurements made with the Quad Array. As seen in FIG. 10*b* the intensity varies with x and y around the surface of the cylinder 170. FIG. 10*b* illustrates the variation in the intensity distribution of fluorescence emission from a single cell. The cylinder 170, set at a distance of 4 mm from the stream for this illustration, highlights the variation of spatial fluorescence intensity distribution for an observation of the edge as compared to an observation of the flat face. The edge observation sees a narrow band of higher intensity emission centered on the sperm cell's edge (previously described with FIG. 9). The face observation sees a broad, relatively flat intensity distribution.

Figure 11:
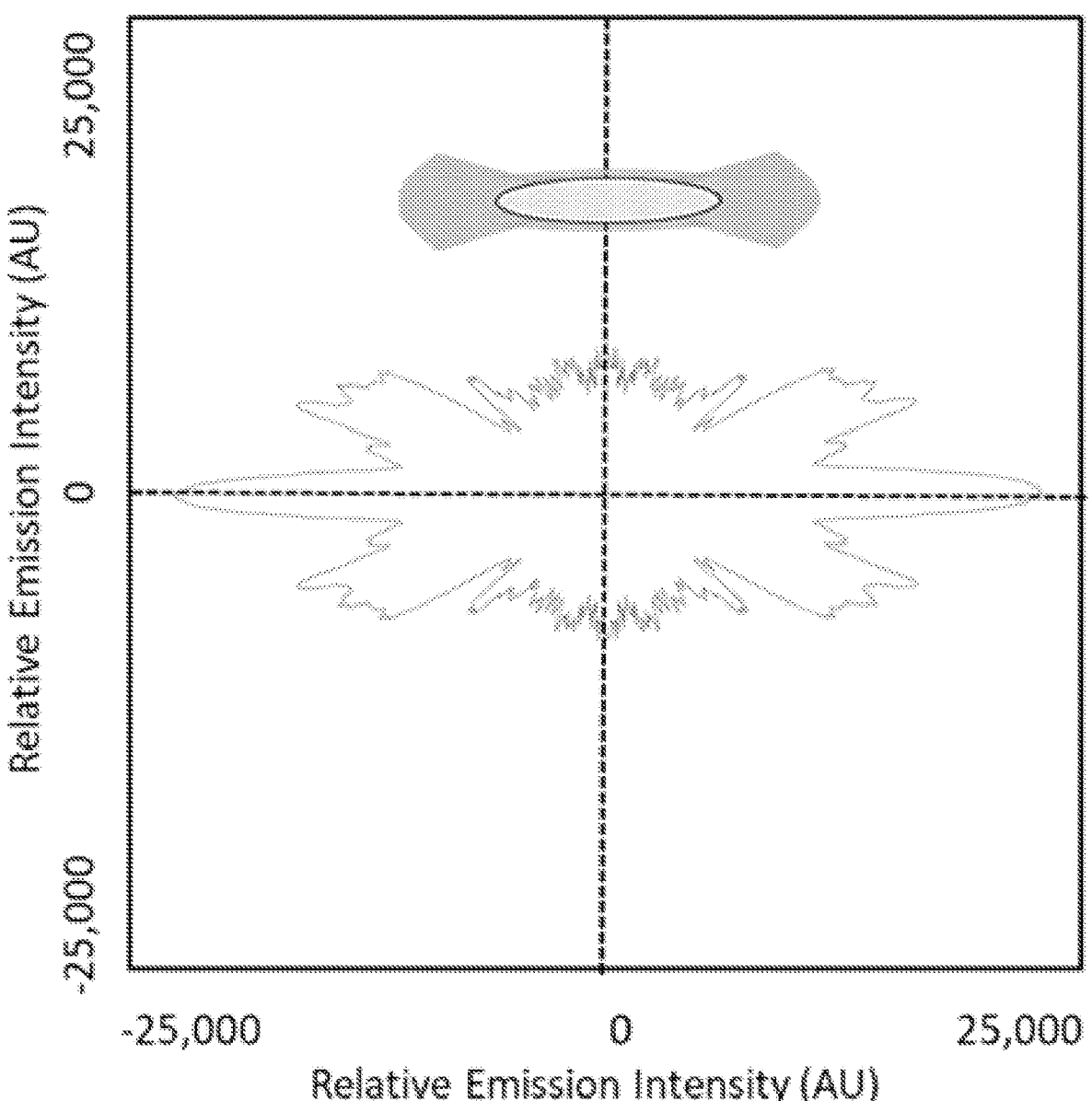
FIG. 11 illustrates the radiation intensity at each radial angle from a single cell that has its edge oriented to the center of the SFL collection optic (i.e. 0°).

The polar plot in FIG. 11 provides a clearer illustration of the radiation intensity at each radial angle from a single cell that has its edge oriented to the center of the SFL collection optic (i.e. 0°).

Figure 12:
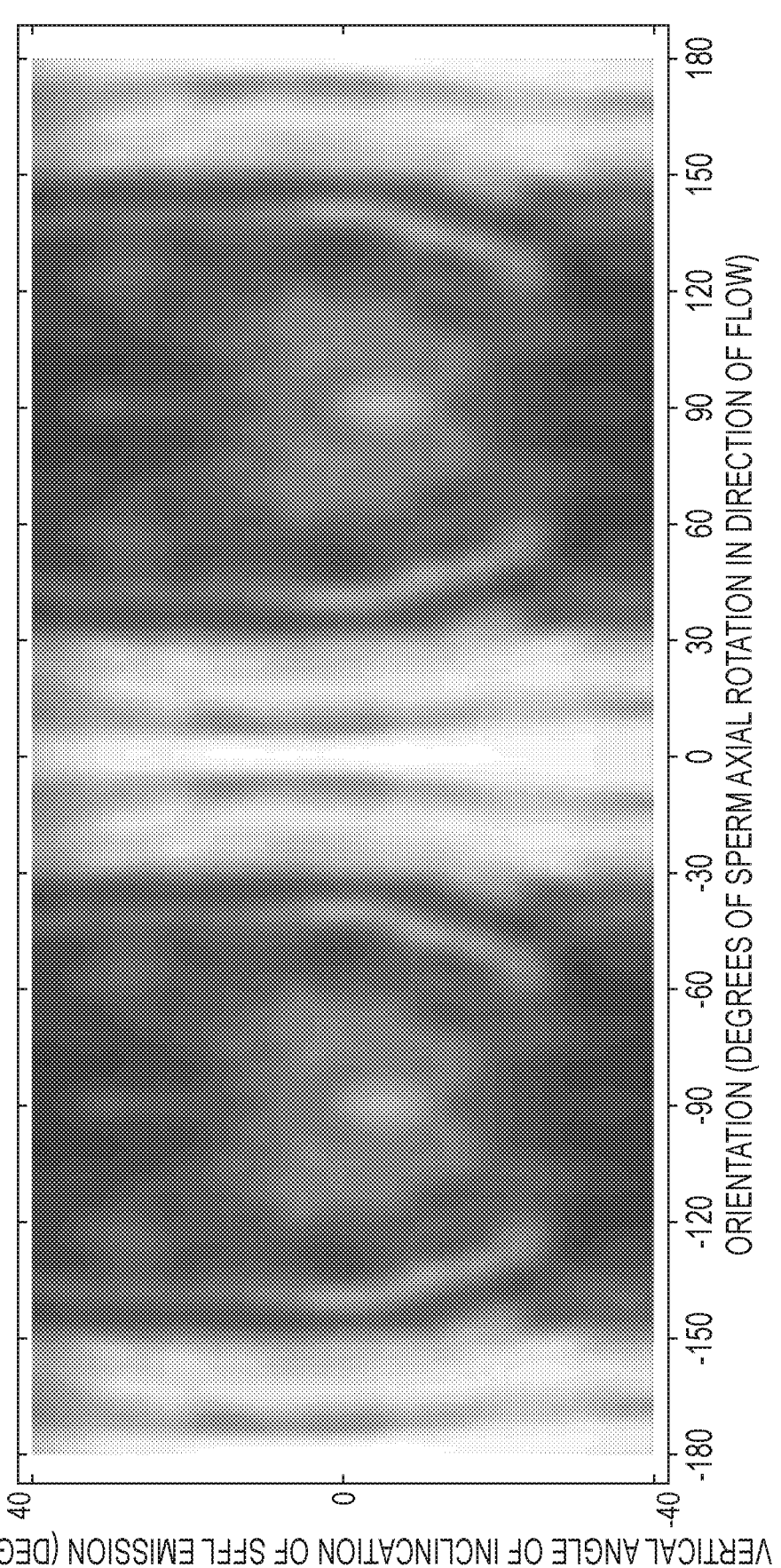
FIG. 12 depicts the cylinder from FIG. 10*b* flattened.

FIG. 12 takes the cylinder shown in FIG. 10*b* and flattens it out. This allows one to visualize the predicted intensity profile for all 360 degrees of the radial angles (x-direction in the plot) and +/−37 degrees for SFL inclination (y-direction in the plot). The edge observation 174 demonstrates a narrow band of higher intensity emission centered on the sperm cell's edge. The face observation 172 demonstrates a broad, relatively flat intensity distribution.

Figure 13A:
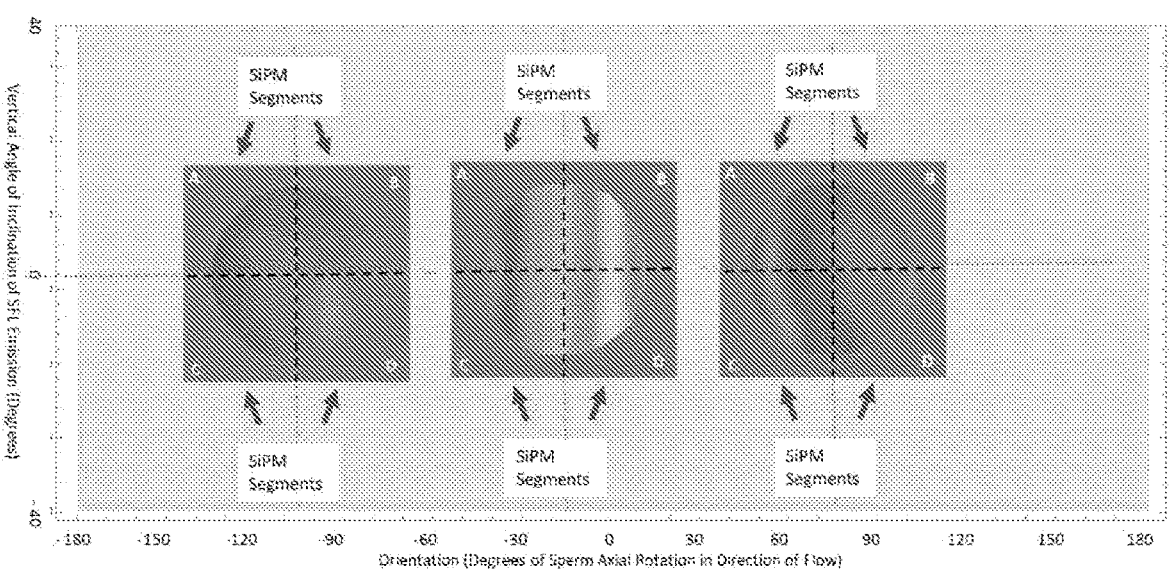
FIG. 13*a* demonstrates the field of view of the collection lens overlaid onto the FIG. 12 fluorescence intensity distribution map.
Figure 13B:
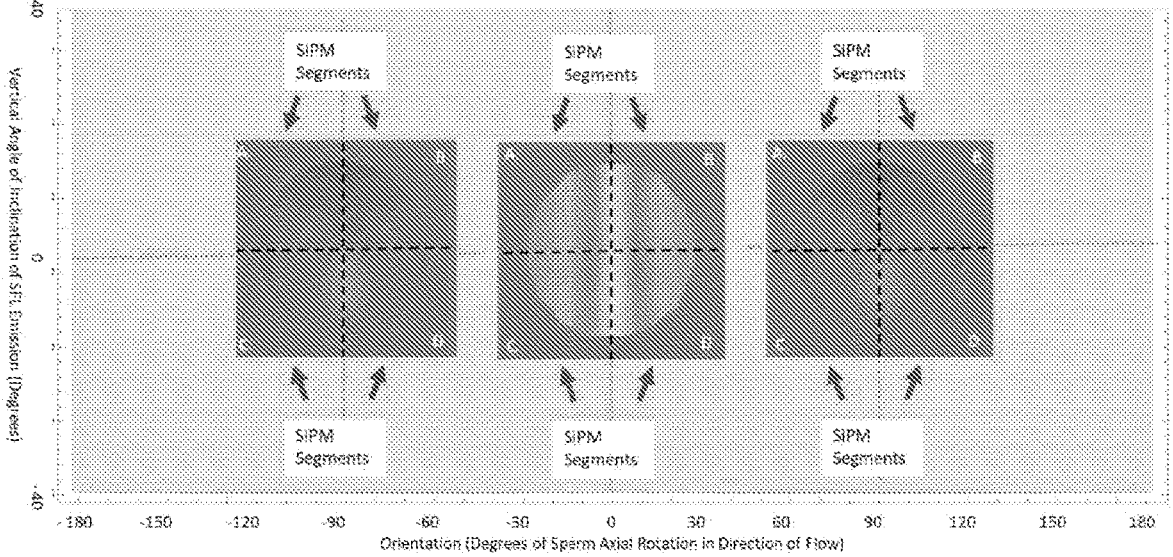
FIG. 13*b* demonstrates an additional field of view of the collection lens overlaid onto the FIG. 12 fluorescence intensity distribution map.

FIG. 13*a* and FIG. 13*b* demonstrate the field of view of the collection lens overlaid onto portions of the FIG. 12 fluorescence intensity distribution map. This allows one to visualize portions of the fluorescence intensity distribution (i.e., the projected spot) that the Quad Array would see for a variety of cell orientations. Six specific cases for orientation are shown in these two figures. They clearly illustrate the variation in $Pos_x$ and $Pos_y$ that results based on the equations previously presented. Shown in FIG. 13*a* are spots on the SiPM Array, based on the model, for three cells having orientations of −90° (270°), 0°, and 90°. All three of these would have Posx and Posy near 0. Shown in FIG. 13*b* are spots on the SiPM Array, based on the model, for three cells having orientations of −105° (285°), −15°, and 75°. The model predicts Posx values for these orientations of 0.03, 0.35, −0.12 respectively.

Figure 14:
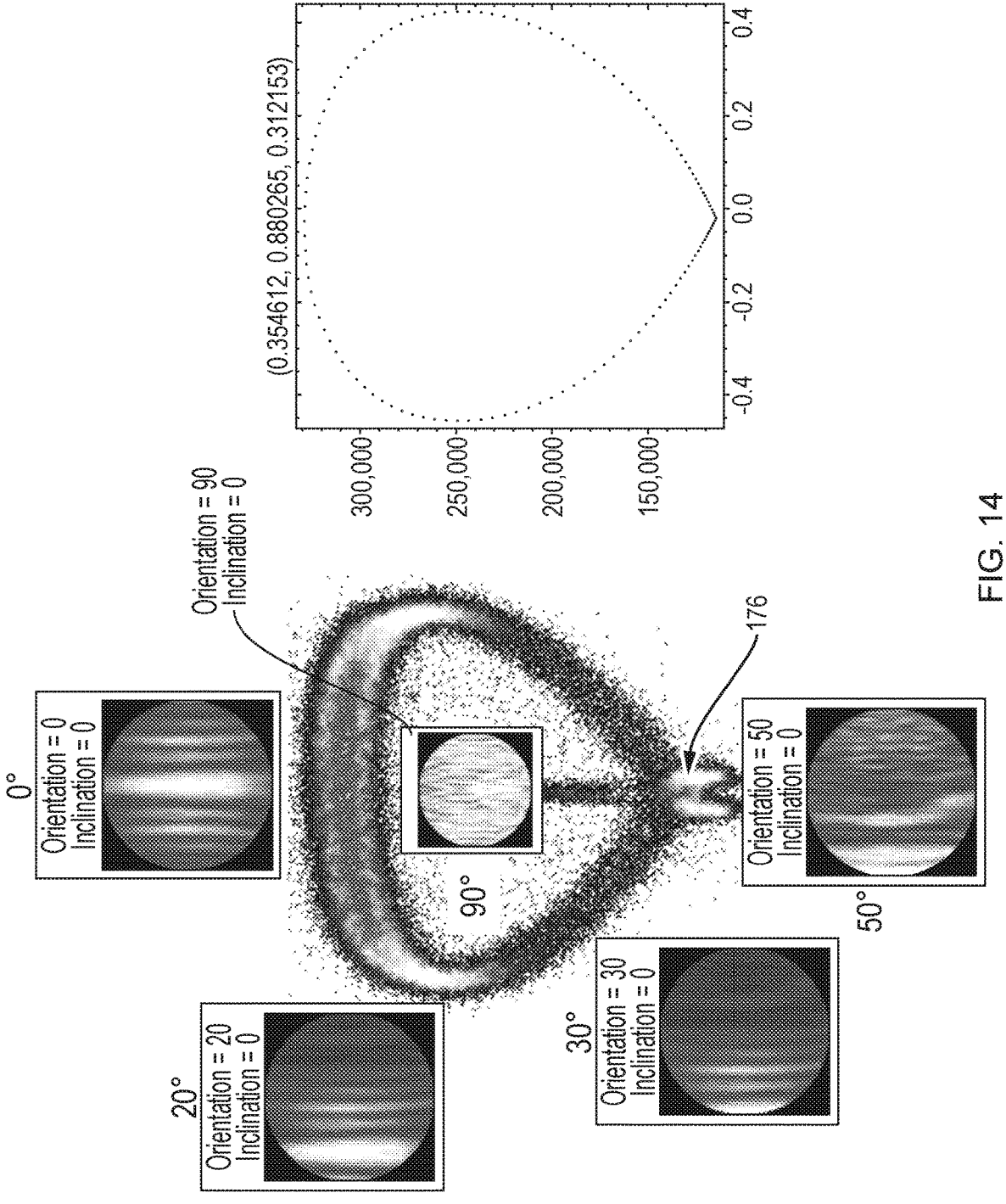
FIG. 14 illustrates the fluorescence intensity distribution of the spots projected onto a Quad Array.

In FIG. 14 images of the fluorescence intensity distribution of the spots projected onto a Quad Array are shown adjacent to the corresponding position for each spot on a necklace plot generated from live measurements. Shown to the right of the actual plot is the necklace predicted by the model. The illustration compares an actual necklace plot acquired from a live bovine sample to the model prediction. On the left in FIG. 14, images representing the spot projected onto the Quad Array for a variety of SFL intensity vs. $Pos_x$ values (or orientation angles) are shown in their corresponding location on the Necklace Plot. The assumption in this case is that the observation inclination is zero degrees. This illustrates how the variations in the fluorescence intensity distribution incident on the Quad Array produces the necklace plot. Shown on the right in FIG. 14 is the Necklace Plot produced by the model for cells passing through the laser beam at a variety of orientation angles. This discontinuity observed at the bottom of the Necklace Plot that also produces the inverted "V" 176 in the center of the plot is thought to be due to a critical angle of incidence. It occurs when the cell's edge is approximately within +/−15 degrees of the incident laser propagation direction.

Figure 15:
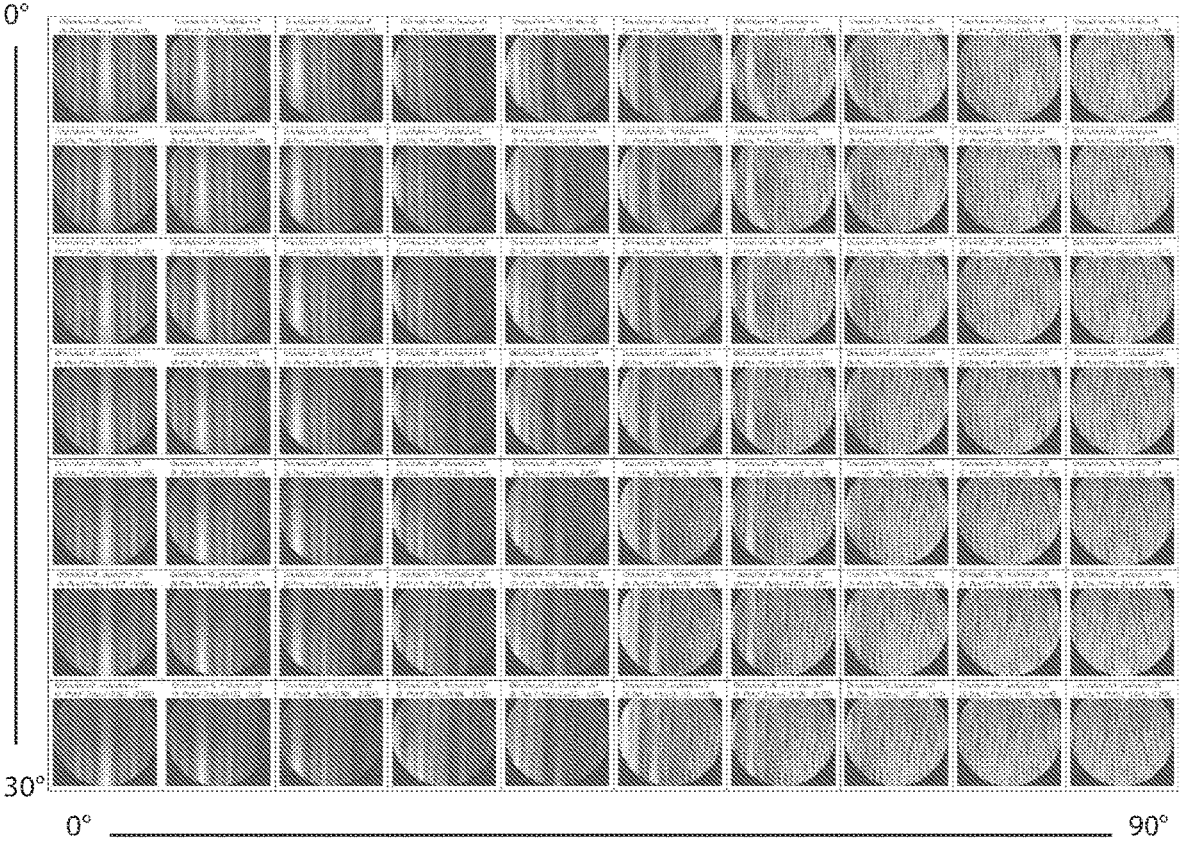
FIG. 15 illustrates an array of images from the model that shows fluorescence intensity spot incident on a Quad Array.

FIG. 15 illustrates an array of images from the model that shows fluorescence intensity spots incident on a Quad Array for cell orientations ranging from 0° to 90° and for angle of observation inclination for the SFL lens ranging from 0° to 30°. This is the output of the model introduced in FIGS. 10*a* and 10*b* for angles of orientation from 0° to 90° (perfect orientation to orthogonal orientation), shown from left to right, and 0° to 30° vertical inclination of the SFL collection lens.

Figure 16:
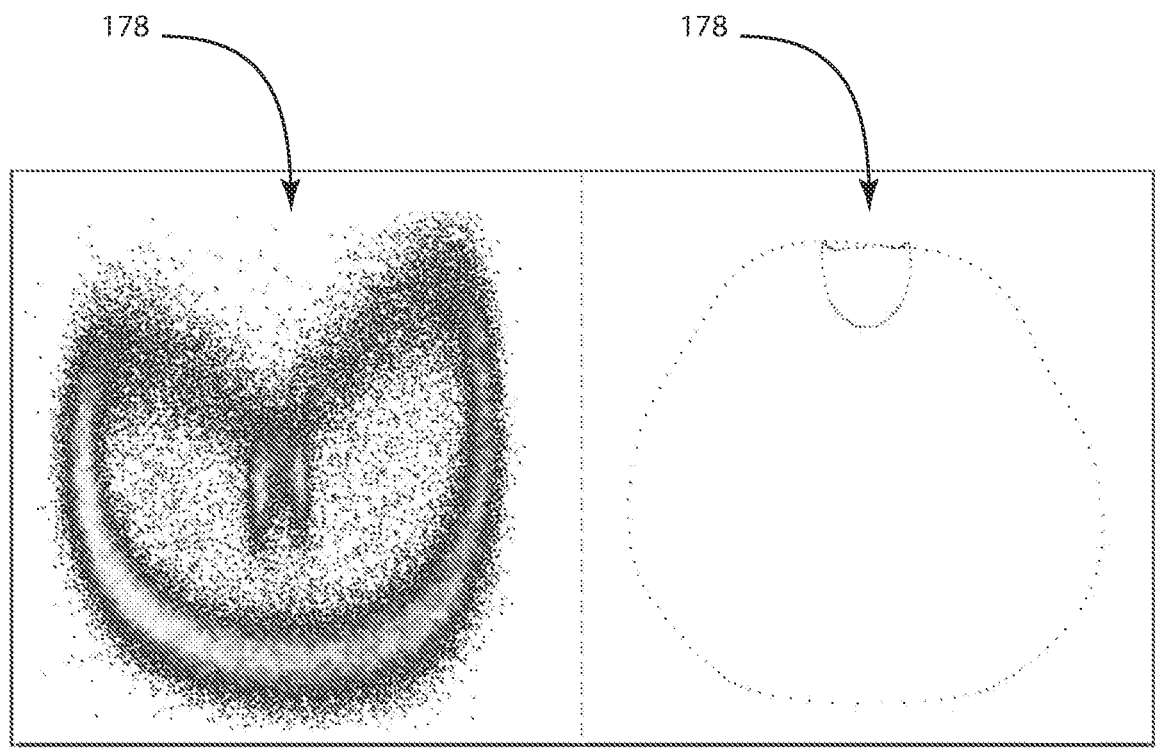
FIG. 16 illustrates an Orientation or "Pretzel" Plot.
Figure 17:
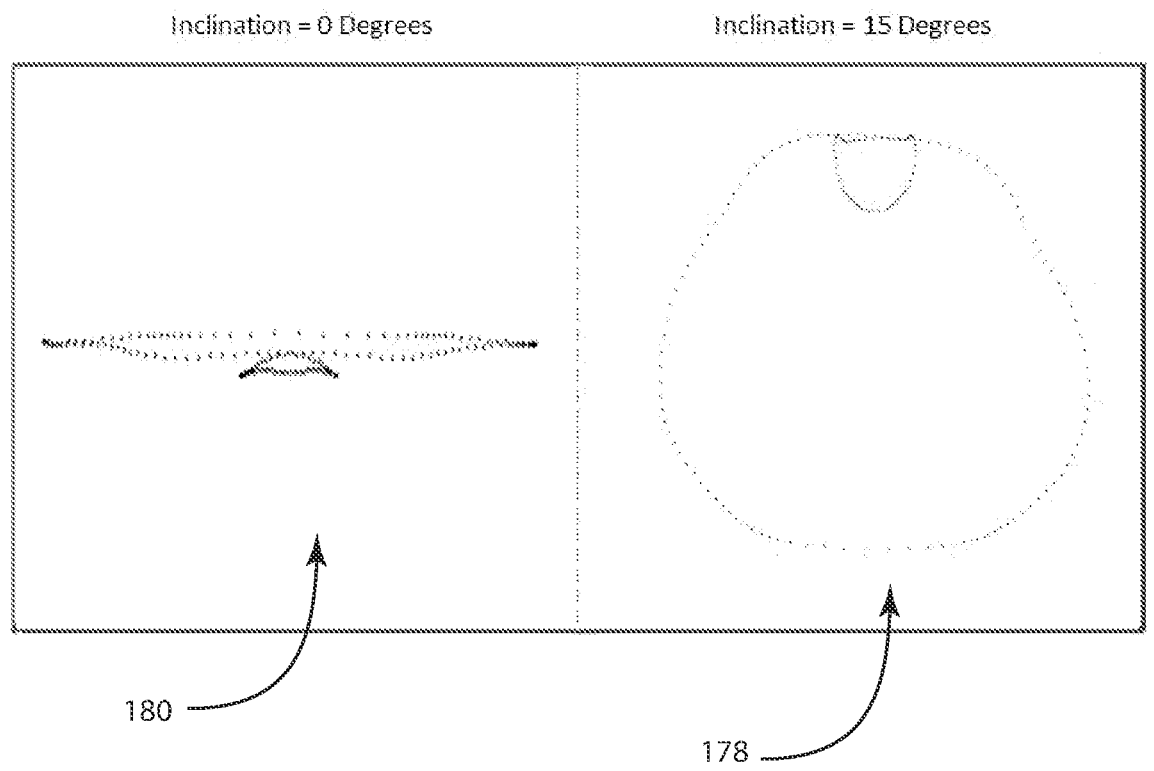
FIG. 17 shows a comparison, based on the modeling, of observation with SFL inclination at 0° (left) and 15° (right).

FIG. 16 illustrates an Orientation or "Pretzel" Plot 178 (named for its obvious shape). This is a plot of SFL $Pos_y$ vs. SFL $Pos_x$. The dynamic range in $Pos_y$ shown is obtained by introducing an inclination of approximately 15° to the SFL collection lens. Without inclination the plot 180 would appear as shown in FIG. 17. Because $Pos_x$ and $Pos_y$ are both ratios, their values do not change with minor variations in fluorescence intensity. Therefore, neither the variation caused by gender (actual DNA content), nor variations introduced by staining, signal gain, or excitation power impact the relative shape or values for this plot. Because of this, the Orientation Plot proves a valuable tool for filtering (gating) for sperm cells within specific ranges of orientation.

FIG. 17 shows a comparison, based on the modeling, of observation with SFL inclination at 0° (left) and 15° (right). By adjusting the inclination of the SFL lens from the 0° used by Johnson, to an angle between 15° and 30° we have produced an intensity-independent method to represent the orientation of a sperm cell passing through the focused laser on a cell sorter. In some embodiments, an inclination angle of 25° is used. Comparison images from the model are shown for 0° and 25° in FIG. 18.

Figure 18:
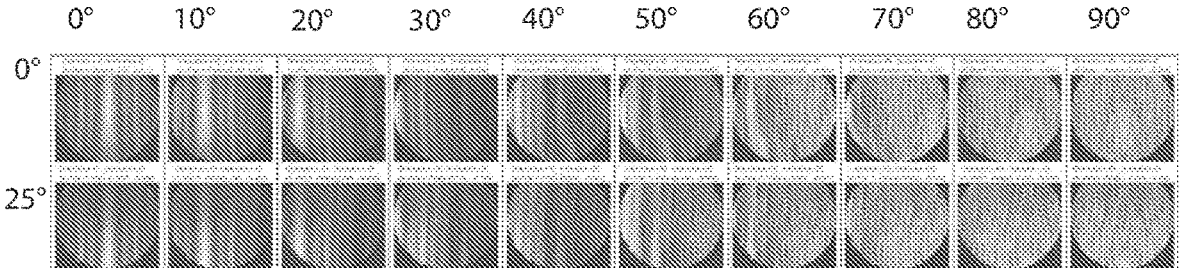
FIG. 18 illustrates comparison predictions of the fluorescence intensity distribution projected onto the Quad Array.

FIG. 18 illustrates comparison predictions of the fluorescence intensity distribution projected onto the Quad Array for sperm cell orientation angles ranging from 0° to 90° and SFL collection lens inclinations of 0° and 25°. The $Pos_x$ and $Pos_y$ values are shown above each image. It can be seen that for orientations below 40° there is a significant variation in the $Pos_y$ values for the two inclinations.

Figure 19:
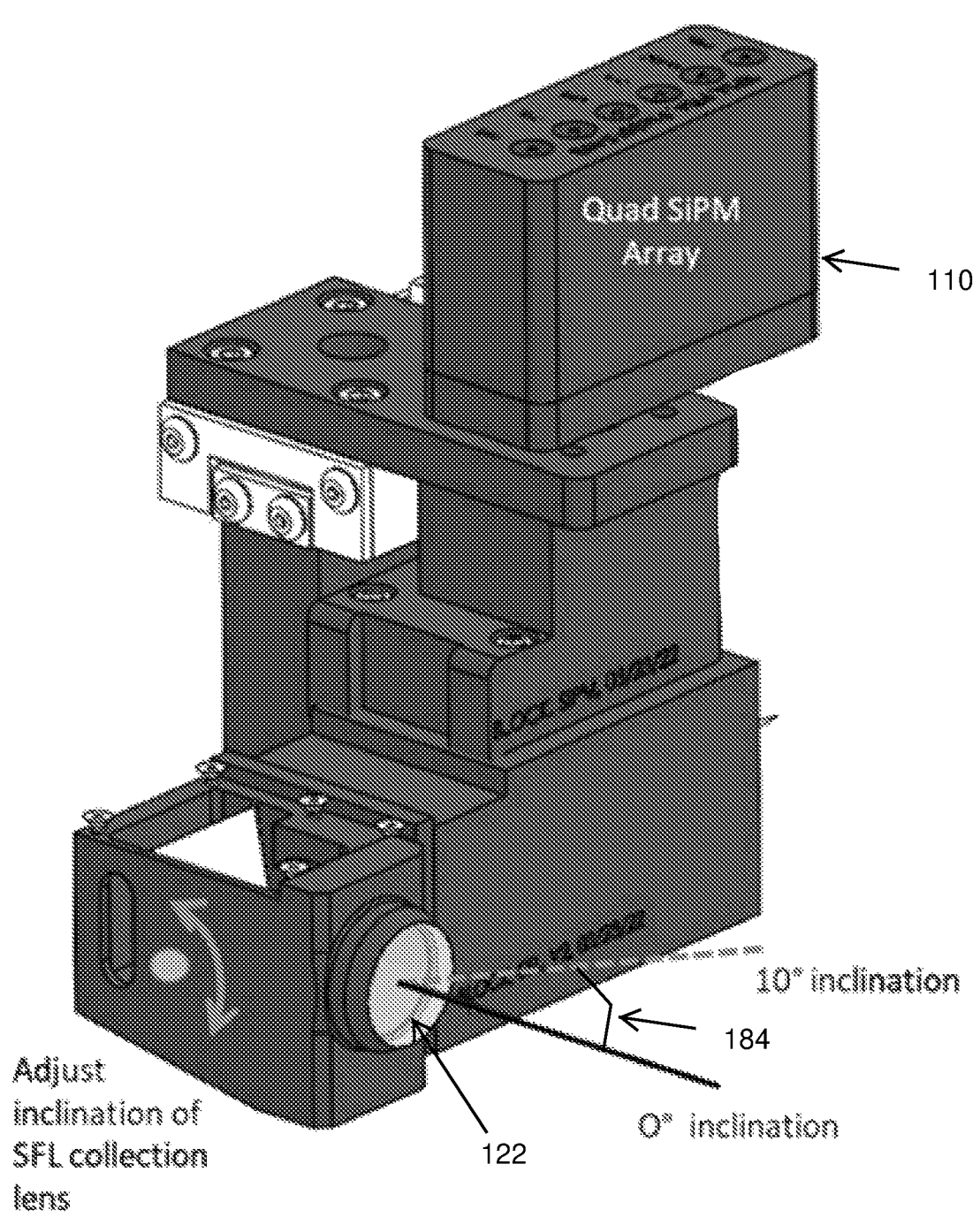
FIG. 19 shows a CAD model of an SFL assembly.

FIG. 19 shows a CAD model of an SFL assembly. This assembly allows the SFL lens to be rotated to a range of inclinations between 0° and 10°. The SFL assembly allows adjustment of the angle of inclination for the SFL collection lens. This example assembly is adjustable between 0° to 10°. In other embodiments, the assembly allows adjustment of the inclination angle in a range from 0° to 15°, in a range from 0° to 20°, in a range from 0° to 25°, or in a range from 0° to 30°.

Figure 20:
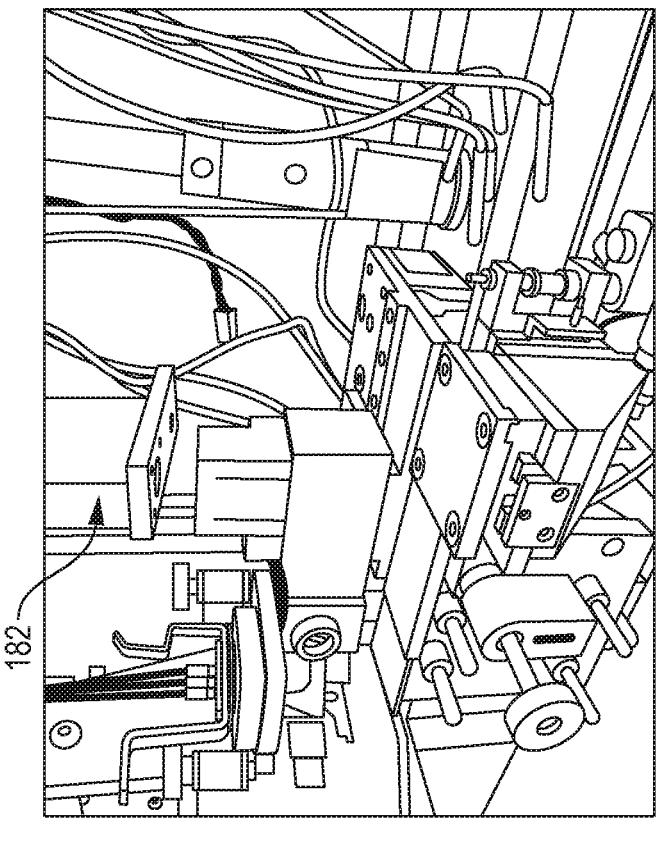
FIG. 20 is a photograph of an example SFL Quad Array 180 mounted on a prototype instrument.
Figure 20:
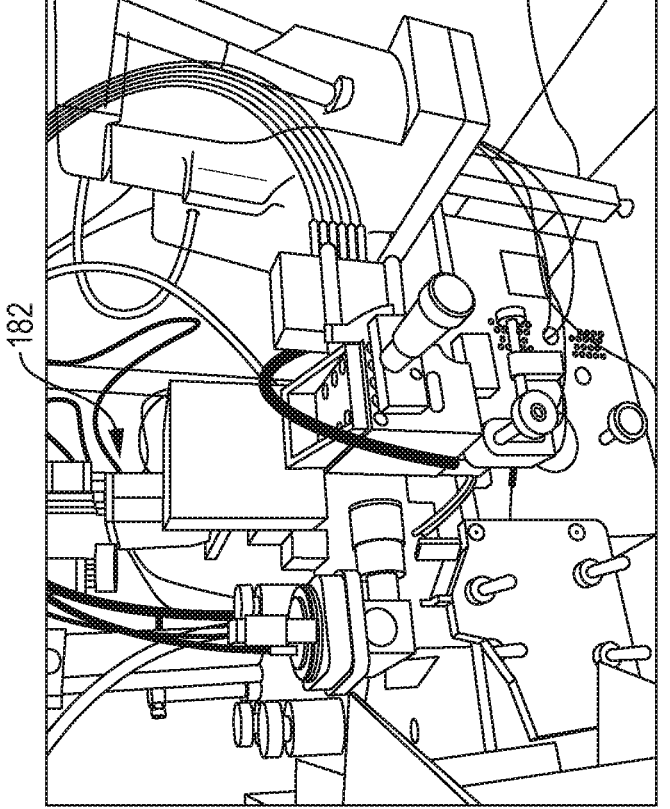
Figure 21:
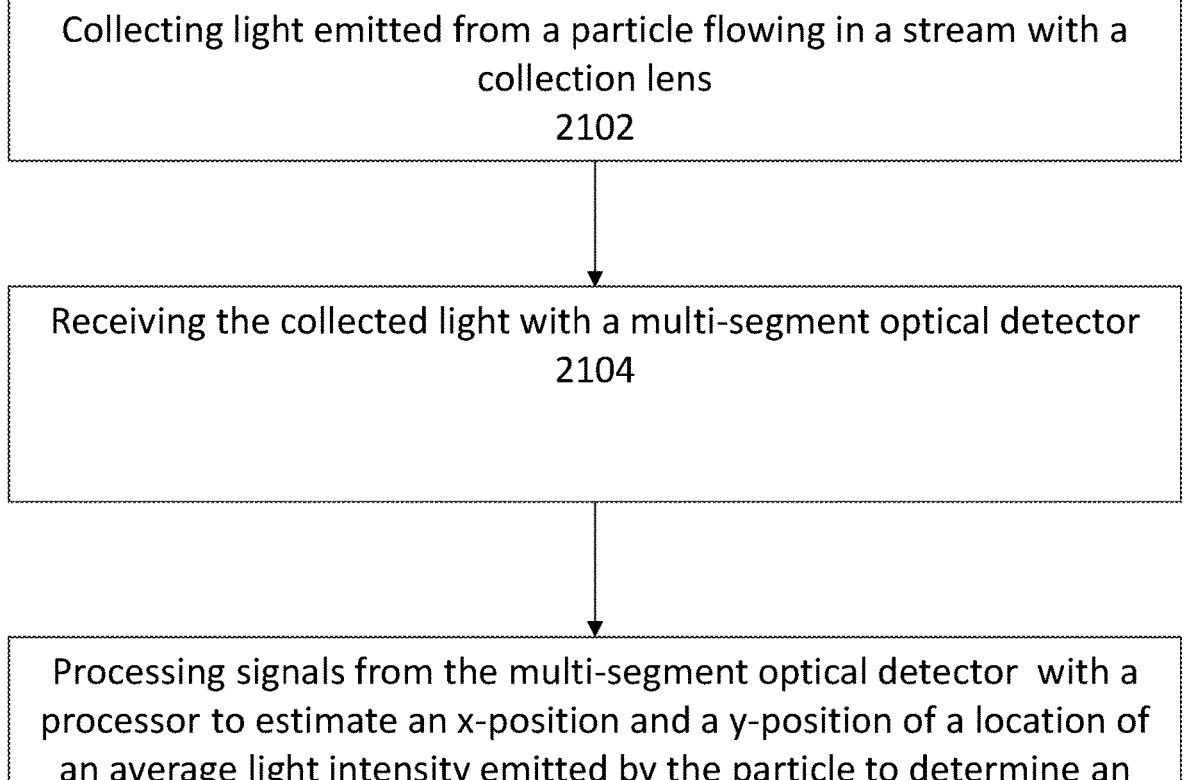
FIG. 21 is a flowchart depicting an exemplary sequence of steps for determining orientation of a particle with a cytometer in an embodiment.

FIG. 20 is a photograph of an example SFL Quad Array 182 mounted on a prototype instrument in a manner that allows the array to be tilted. This produces a similar effect as changing the angle of inclination of the SFL collection lens. Using this method it is possible to create an inclination similar to a 15 degree inclination of the SFL collection lens FIG. 21 is a flowchart depicting an exemplary sequence of steps for determining orientation of a particle with a cytometer in an embodiment. The sequence begins by collecting light emitted from a particle flowing in a stream with a collection lens (step 2102). The collected light is then received with a multi-segment optical detector (step 2104). Signals from the multi-segment optical detector are then processed with a processor to estimate an x-position and a y-position of a location of an average light intensity emitted by the particle to determine an orientation of the particle (step 2106).

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in many computing languages.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

The invention claimed is:

1. A cytometer comprising:
   a collection lens configured to collect light emitted from a particle flowing in a stream;
   a multi-segment optical detector to receive light collected by the collection lens, and
   a processor configured or programmed to process signals from the multi-segment optical detector to estimate an x-position and a y-position of a location of an average light intensity emitted by the particle to determine an orientation of the particle.

2. The cytometer of claim 1, wherein the multi segment optical detector is a N×N array.

3. The cytometer of claim 2, wherein the multi-segment optical detector is a 2×2 quad array.

4. The cytometer of claim 2, wherein the multi-segment optical detector is an 8×8 or 16×16 array.

5. The cytometer of claim 1, wherein the particles are bovine sperm cells.

6. A cytometer comprising:

a collection lens configured to collect light emitted from a particle flowing in a stream, the collection lens configured to incline between 0 and 30 degrees;

a 2×2 quad array to receive light collected by the collection lens, and a processor configured or programmed to process signals from the 2×2 quad array to estimate an x-position and a y-position of a location of an average light intensity emitted by the particle to determine an orientation of the particle.

7. The cytometer of claim 6, further comprising:

an amplifier configured to amplify signals received from each segment of the 2×2 quad array; and an analog to digital converter (ADC) configured to receive the amplified signals as input.

8. The cytometer of claim 7, further comprising:

a field programmable gate array configured to process samples from the ADC to calculate an average intensity seen for each particle by the quad array.

9. The cytometer of claim 7, further comprising:

a microprocessor, graphics processing unit (GPU) or other programmable or configurable processor used alone or in combination with an FPGA to process samples from the ADC to calculate an average intensity seen for each particle by the quad array.

10. The cytometer of claim 7, wherein the particles are bovine sperm cells.

11. The cytometer of claim 1, wherein the processor is further configured or programmed to:

use spatial data collected by the multi-segment optical detector to identify optical alignment errors.

12. The cytometer of claim 11, wherein the processor is further configured or programmed to:

use the spatial data identifying the optical alignment errors in a feedback loop to automatically align the multi-segment optical detector during operation.

13. The cytometer of claim 10, wherein the processor is further configured or programmed to:

use spatial data collected by the 2×2 quad array to identify optical alignment errors.

14. The cytometer of claim 13, wherein the processor is further configured or programmed to:

use the spatial data identifying the optical alignment errors in a feedback loop to automatically align the 2×2 quad array during operation.

15. The cytometer of claim 6, wherein the collection lens is inclined at 15 degrees.

16. The cytometer of claim 6, wherein the collection lens is inclined at 25 degrees.

17. A method for determining orientation of a particle with a cytometer, comprising:

collecting light emitted from a particle flowing in a stream with a collection lens;

receiving the collected light with a multi-segment optical detector, and processing signals from the multi-segment optical detector with a processor to estimate an x-position and a y-position of a location of an average light intensity emitted by the particle to determine an orientation of the particle.

18. The method of claim 17, wherein the multi-segment optical detector is a 2×2 quad array.

19. The method of claim 17, wherein the particle is a bovine sperm cell.

20. The method of claim 17, further comprising:

inclining the collection lens between 0 and 30 degrees while collecting the light emitted from the particle.

* * * * *